Dec. 13, 1927.

L. C. BLASDEL

BRAKE MECHANISM

Filed April 7, 1925

Inventor:
Leo C. Blasdel;
Attorneys.

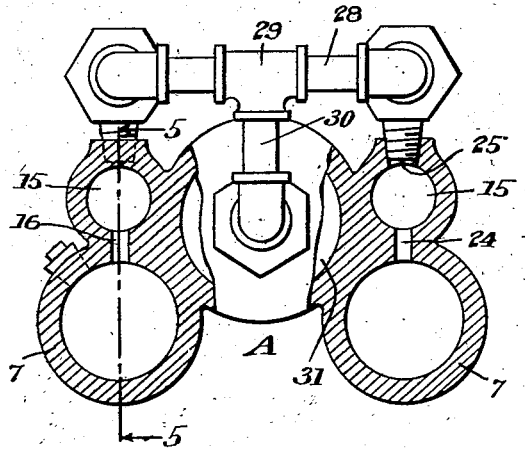
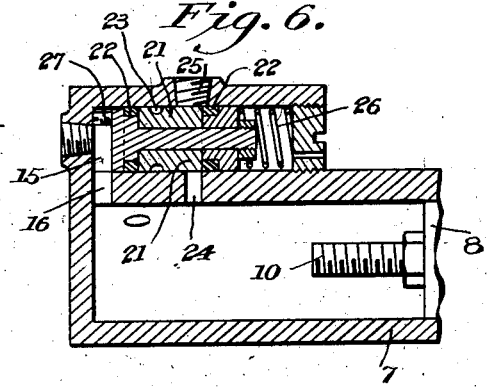
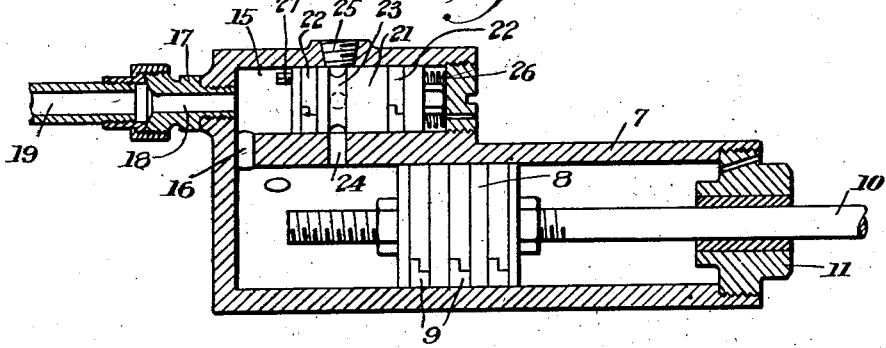
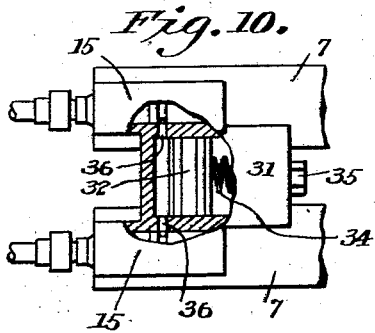

Dec. 13, 1927. 1,652,232
L. C. BLASDEL
BRAKE MECHANISM
Filed April 7, 1925 3 Sheets-Sheet 3
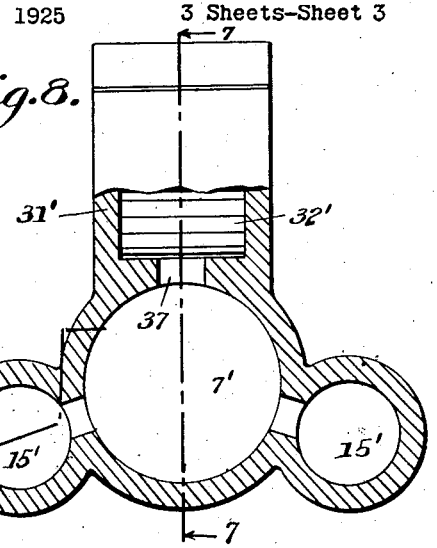
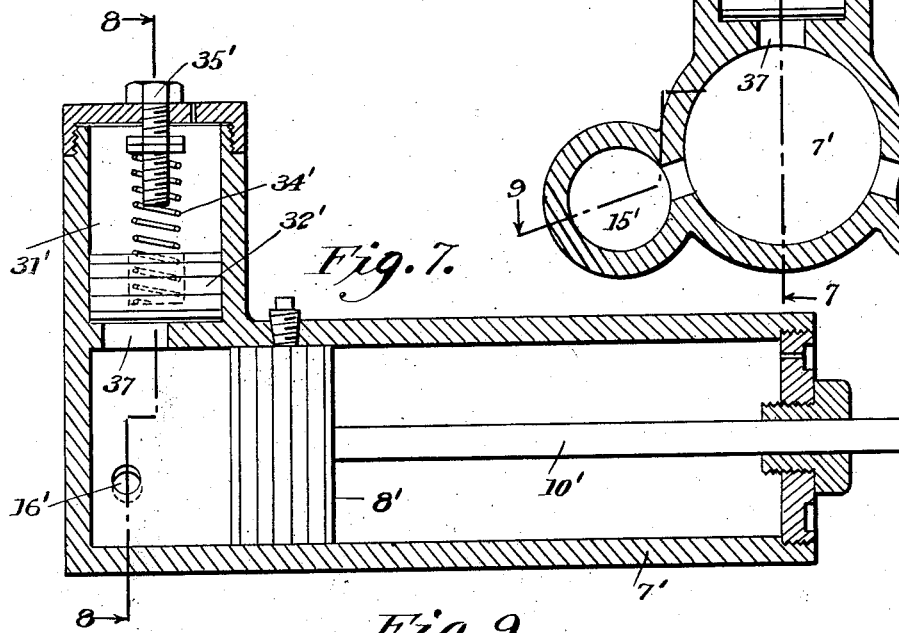
INVENTOR:
Leo C. Blasdel
BY
ATTORNEYS.

Patented Dec. 13, 1927.

1,652,232

UNITED STATES PATENT OFFICE.

LEO C. BLASDEL, OF LOS ANGELES, CALIFORNIA.

BRAKE MECHANISM.

Application filed April 7, 1925. Serial No. 21,304.

This invention relates to an improved brake mechanism and is particularly directed to a brake of the hydraulic type adapted for use upon motor vehicles.

Brake mechanisms of the type to which this invention is directed generally include individual brake devices for the ground wheels, manually operated fluid compressor means, and suitable intermediate conduits containing oil or other fluid serving as a pressure transmitting medium.

In brakes of this general character in which the pressure lines to the several brake devices are all in direct communication with a single compressor means, a leak in any one pressure line will disable the entire brake system and will usually result in a loss of all of the oil. To overcome this, various arrangements have heretofore been proposed in which the brake devices are connected in pairs with each pair operated by a separate compressor means, there being some type of mechanical equalizer between both compressor pistons and the brake pedal by which said pistons are operated, the purpose of such an arrangement being to equalize the pressure to the several brake devices and to divide the conduit system so that a leak in the conduits to the one pair of brakes will not cause loss of oil from the other conduits, but it has been found that in a construction of this sort, a leak in one pressure line will, by reason of the mechanical equalizer, cause a pressure drop in both pressure lines and thereby nullify the braking effect. To thereafter build up a braking pressure in the undamaged line it is necessary to further operate the brake pedal to move the compressor piston of the damaged line to the limit of its stroke to then serve as a fixed abutment against which the equalizer may act upon a continued depression of the brake pedal, to drive the compressor piston of the undamaged line and build up a braking pressure therein. This operation may be exceedingly slow in case of a very small leak as the piston of the damaged line can only be moved to the end of its stroke as fast as the oil is expelled through the rupture causing the leak.

In connecting the brake devices in pairs it has heretofore been proposed in some instances to include in each pair, one front and one rear wheel on one side of the vehicle, and in other instances to include in each pair, one front wheel and a diagonally opposite rear wheel, and to connect each pair with an independent compressor means. With such an arrangement a leak in a pressure line will in one instance disable the brakes of the wheels on one side of the vehicle, and in the other instance will disable the brakes of one front wheel and one rear wheel; in either case such leak results in the braking of only one front wheel, in which event it has been found that it would then be difficult, if not impossible, to maintain adequate control of the vehicle.

It is therefore an object of the present invention to provide a brake mechanism of the hydraulic type in which a plurality of pressure lines are each in permanent communication with companion compressor means operated in unison, and to provide automatically functioning means for equalizing the pressure in the several pressure lines.

A further object is to provide an apparatus of the above character in which a loss of the pressure transmitting fluid from one pressure line will not result in a draining of fluid from other portions of the apparatus and will have no detrimental effect upon the operation of the brake devices associated with the other pressure lines.

Another object is to provide a means for regulating the maximum braking pressure of the system and for preventing an exceedingly rapid and violent application of the brakes due to violent manual operation of the compressor means.

Another object is to connect the brake devices in pairs, one pair including both front brakes and another pair including both rear brakes, and providing intermediate communicating pressure equalizing means.

Various other objects and advantages will be more fully apparent from the following description of the accompanying drawings which form a part of this disclosure, and which illustrate a preferred form of embodiment of the invention.

In the drawings:

Figure 4 is a section taken approximately on line 4—4 of Fig. 2;

Figure 5 is a section taken on line 5—5 of Fig. 4;

Figure 6 is a fragmentary section similar to Fig. 5, showing the parts in a different position in the operation;

Figure 2:
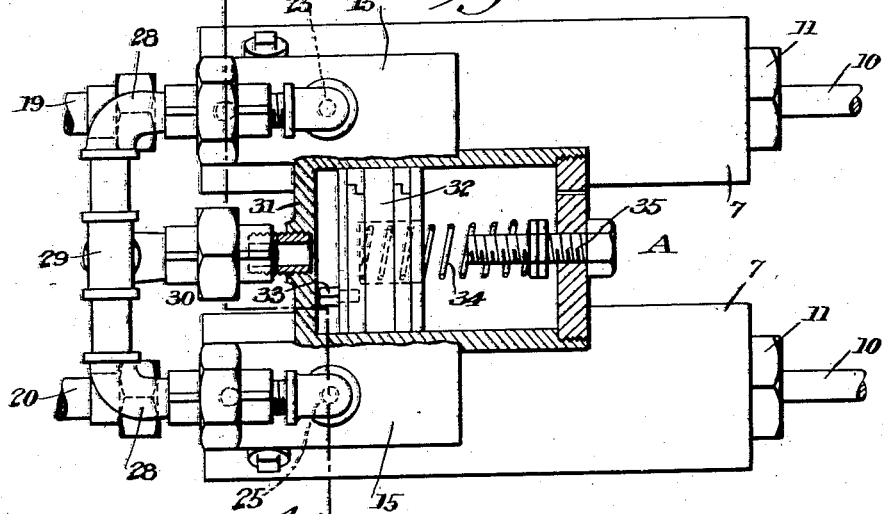
Figure 2 is an enlarged plan view, partly in section, of the compressor means and control unit.
Figure 3:
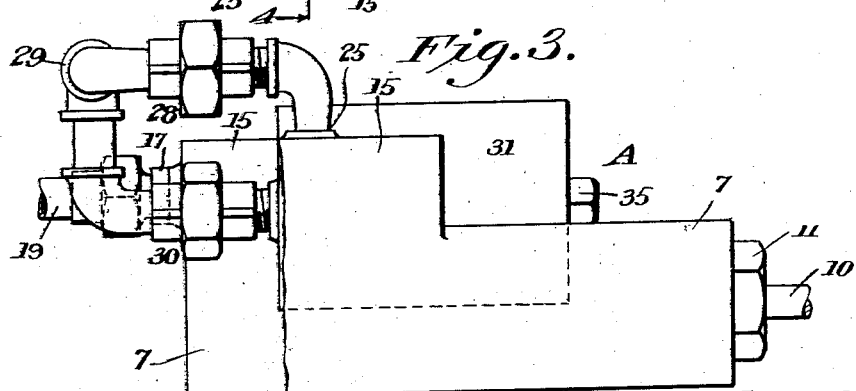
Figure 3 is a side elevation, partly broken away, of the compressor and control unit.

Figures 7, 8 and 9 show a modified form of compressor means and control unit, Fig. 7 being a section on line 7—7 of Fig. 8, Fig. 8 being a section on line 8—8 of Fig. 7, and Fig. 9 being a plan view, partly broken away, of the unit shown in Figs. 7 and 8;

Figure 10 illustrates a modification of the general form of unit shown in Fig. 2; and, Figures 11 and 12 show in diagrammatic form, modified methods of connecting the brake devices in pairs.

Corresponding parts in all the figures are designated by the same reference characters.

Figure 1:
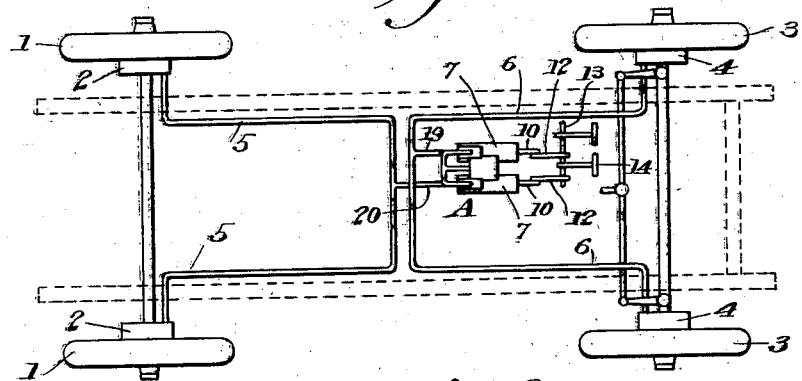
Figure 1 is a semi-diagrammatic plan view of a motor vehicle chassis showing the improved brake structure applied.

In Fig. 1 of the drawings the brake mechanism of the present invention is shown associated with the usual type of motor vehicle in which the rear wheels 1 are provided with brake devices 2 of a conventional fluid pressure type and the front wheels 3 are provided with similar brake devices 4. The several brakes are operated by hydraulic pressure generated in a compressor and control unit indicated generally by the reference character A which pressure is transmitted to the rear brakes 2 by pressure transmitting oil or other fluid contained in conduits 5 and to the front brakes 4 by oil or other fluid contained in conduits 6.

The unit A includes two like parallel compression cylinders 7 each containing a piston 8 having suitable piston rings 9, or other packing means, each piston having adjustably secured thereto a piston rod 10 extending outwardly through the head 11 of the respective cylinder. As shown in Fig. 1, each of said piston rods is operatively connected to a lever 12 secured to the brake pedal shaft 13 so that upon downward movement of said brake pedal 14 the pistons will simultaneously be driven rearwardly in their respective cylinders.

With particular reference to Figs. 5 and 6 of the drawings it will be noted that just above the rear portion of each compression cylinder there is provided a relatively short valve chamber 15, the rearward end of which is in constant communication with the rearward end of the cylinder 7 through a passage 16, and is provided with a fitting 17 providing an outlet 18. In the preferred arrangement shown in Fig. 1, the fitting 17 of one of said valve chambers connects with a short conduit 20 joined with the conduits 5 leading to the rear brake devices 2 and the fitting 17 of the other valve chamber connects with a short conduit 19 joined with the conduits 6 leading to the front brake devices 4. Thus the brakes associated with both rear wheels are in direct communication with one pressure cylinder and those associated with both front wheels are in direct communication with the other pressure cylinder.

In the system shown in Fig. 11, the pressure lines associated with the conduits 19 and 20 respectively, connect the front and rear wheels in diagonally opposite pairs, and in Fig. 12, the conduits 19 and 20 respectively, each connect with one front and one rear wheel on one side of the vehicle.

Within each of the valve chambers 15 is an equalizing valve 21 having relatively spaced piston rings 22 and an intermediate peripheral groove 23, and when the valve 21 is in forward operated position as shown in Fig. 5, said groove registers with a port 24 communicating with the companion cylinder 7 rearwardly of the piston 8, and with an opposite opening 25. Upon a return of the valve 21 to normal position (as shown in Fig. 6), which return is effected by a normalizing spring 26, the groove 23 is out of registry with the port 24 and the opening 25 and communication between the cylinder 7 and the opening 25 is then closed by the ungrooved portion of the valve 21. An abutment screw 27 in the rear end of the valve 21 contacts the wall of the valve chamber to limit the valve movement so as not to block the passage 16.

With particular reference to Figs. 2 and 4 of the drawings it will be seen that the two openings 25 of the respective valve chambers are connected by a pipe line 28 having therein a T-fitting 29 to which is connected a branch pipe line 30 leading to and communicating with the rear end of a pressure regulator cylinder 31. Thus, upon operation of the equalizer valves 21 direct communication will be established between the two compression cylinders 7 and to the pressure regulator cylinder 31 by the pipe line 28 and its branch line 30.

Within the cylinder 31 is contained a piston 32, preferably carrying suitable piston rings or other packing, said piston 32 being provided with an abutment screw 33 limiting its rearward movement, and adapted to move forwardly against the tension of a pressure regulating spring 34 interposed between the piston and an adjusting screw 35 screw-threaded in the forward wall of the cylinder 31.

In the operation of the construction thus far described, a depression of the brake pedal 14 will force the two compressor pistons 8 rearwardly, in unison, in their respective cylinders 7 compressing the oil therein and in the conduit lines to the several brake devices, any slack in the mechanism of the individual brake devices being taken up during the first part of such pedal movement. With a building up of the pressure by continued depression of the brake pedal, the equalizing valves 21 will be forced forwardly against the tension of their respective springs 26 and the grooves 23 thereof will be brought into registry with the respective ports 24 and openings 25. Thus during the brake movement direct communication is established between all of the conduit or pressure lines through the grooves 23 in the equalizer valve and the intermediate connecting pipe lines, thereby effecting an automatic equalization of pressure to the several brake devices. With the establishment of this direct communication between the several brake devices communication is also established between the pressure lines and the pressure regulator cylinder 31, and with the spring 34 thereof previously adjusted to permit a certain maximum brake pressure to be built up in the pressure lines, it will be evident that pressure in excess of such maximum will be absorbed by movement of the regulator piston 32 against its regulating spring 34. This provides a positive automatic regulation of the maximum braking pressure exerted by the brake devices regardless of a greater pressure being applied to the brake pedal, it of course being understood that the throw of the brake pedal is limited and the possible movement of the pressure regulator piston 32 is sufficient to take care of all pressures within the range of movement of the brake pedal. The pressure regulator also serves as a shock absorber; that is, in event of a rapid and violent depression of the brake pedal resulting in a sudden building up of pressure above the maximum braking requirements, the excess will be immediately absorbed by the regulator and thus prevent injury to the system or a locking of the brake devices.

In the modification shown in Fig. 10, the pipe lines 28 and 30 have been eliminated as are the openings 25, intercommunication in this instance being established through the valve grooves 23 and through ports 36 leading from the valve chambers 15 directly into the regulator cylinder 31.

Now, with the equalizer valves 21 in operated positions, as shown in Fig. 5, let it be assumed that a leak occurs in the conduits 6. Upon such occurrence there will be an immediate reduction of the pressure in the damaged line and its companion valve chamber and the spring 26 of the respective valve 21 will normalize said valve, thus closing the opening 25 so that the braking effect of the undamaged lines will be unaffected and the oil in such undamaged lines will not drain into the damaged line and be lost.

In the form of compressor and control unit illustrated in Figs. 7, 8 and 9, there is provided a single compressor cylinder 7' having a piston 8' therein which is provided with a piston rod 10 operated by the brake pedal in the usual manner. Rearwardly of the piston the compressor cylinder communicates by means of ports 16' with the rear ends of respective auxiliary chambers 15' having their forward ends connected to and in communication with conduit lines 19' and 20' leading to the respective pairs of brake devices. Within each chamber 15' is a free piston 21' which divides the oil column and prevents loss of the oil therefrom upon the occurrence of leakage in the other pressure line. The rear portion of the cylinder 7' also communicates by means of a port 37, with a pressure regulating cylinder 31' having therein a piston 32', a regulating spring 34', and a regulating screw 35', and functioning in a manner similar to the regulator previously described.

I have thus provided a brake mechanism producing an equalized automatically regulated braking effect, combined with means preventing loss of the entire volume of pressure transmitting fluid upon leakage from one conduit line, and arranged to maintain an effective braking operation of the brakes associated with the undamaged conduit lines, and while the specific forms of embodiment herein illustrated and described are fully capable of fulfilling all of the objects primarily stated, it is to be understood that I do not wish to limit the invention in this regard, for it is susceptible of embodiment in various other forms, all coming within the scope of the following claims.

Having thus disclosed my invention, I claim and desire to secure by Letters Patent:

1. In a hydraulic brake system for vehicles, the combination of a plurality of fluid actuated brake devices associated with the respective ground wheels, a plurality of compressor devices arranged to operate in unison, a plurality of conduits containing a pressure transmitting fluid and in permanent communication with the respective compressor devices and brake devices, and fluid operated means responsive to pressure created by operation of the compressor devices and functioning to equalize the pressure in the several conduits.

2. In a hydraulic brake system for vehicles, the combination of a plurality of fluid-actuated brake devices associated with the respective ground wheels, a plurality of hydraulic pressure lines associated with the brake devices, each pressure line including a compression cylinder having a piston therein, means for operating the pistons in unison, and pressure-operated means for establishing communication between the pressure lines to effect an equalization of pressure therein.

3. In a hydraulic brake system for vehicles, the combination of a plurality of fluid actuated brake devices associated with the respective ground wheels, a pair of hydraulic pressure lines associated with the brake devices and communicating one with the other, each pressure line including a compression cylinder having a piston therein, means for operating the pistons in unison, and equalizer means normally closing communication between the pressure lines and responsive to a raise of pressure therein to establish such communication to equalize the pressure in both pressure lines.

In testimony whereof, I have signed my name to this specification.

LEO C. BLASDEL.